(12) United States Patent
Oelsch

(10) Patent No.: US 6,851,860 B2
(45) Date of Patent: Feb. 8, 2005

(54) HYDRODYNAMIC THRUST BEARING

(75) Inventor: Juergen Oelsch, Hohenroth (DE)

(73) Assignee: Minebea Co., Ltd. (JP)

( * ) Notice: Subject to any disclaimer, the term of this patent is extended or adjusted under 35 U.S.C. 154(b) by 12 days.

(21) Appl. No.: 10/621,763

(22) Filed: Jul. 17, 2003

(65) Prior Publication Data

US 2004/0081376 A1 Apr. 29, 2004

(30) Foreign Application Priority Data

Jul. 22, 2002 (DE) ..................... 202 11 065 U

(51) Int. Cl.$^7$ ............................................. F16C 17/10
(52) U.S. Cl. ..................................................... 384/107
(58) Field of Search .............................. 384/107, 112, 384/121, 123, 124

(56) References Cited

U.S. PATENT DOCUMENTS 5,357,163 A  10/1994  Minakuchi et al.

FOREIGN PATENT DOCUMENTS

| DE | 196 37 014 | 3/1998 |
| DE | 196 37 015 | 3/1998 |
| GB | 274954 | 7/1927 |
| JP | 2000310220 | 11/2000 |
| JP | 2000324753 | 11/2000 |
| JP | 2001132738 | 5/2001 |

*Primary Examiner*—Lenard A Footland
(74) *Attorney, Agent, or Firm*—Joel Lutzker; Anna Vishev; Schulte Roth & Zabel LLP

(57) ABSTRACT

A hydrodynamic thrust bearing, particularly forming a part of a bearing system for a rotary bearing of spindle motors utilized to power hard disk drives. The thrust bearing includes at least one annular thrust plate and a counter bearing corresponding to the thrust plate, wherein the thrust plate is firmly connected to a shaft rotatably supported by means of a radial bearing system. The thrust plate is arranged on the shaft which has an axial bore in the area where the thrust plate is to be positioned. A fixing element affixing the thrust plate to the shaft is pressed into the axial bore of the shaft. The outer diameter of the fixing element is greater than the inner diameter of the axial bore. This type of press connection between the thrust plate and the shaft allows thinner thrust plates to be utilized with the performance of the thrust bearing remaining the same or improving.

14 Claims, 5 Drawing Sheets

HYDRODYNAMIC THRUST BEARING

CROSS REFERENCE TO RELATED APPLICATION

This application claims all rights of priority to German Patent Application No. DE 202 11 065.6, filed on Jul. 22, 2002 (pending).

FIELD OF THE INVENTION

The invention relates to a hydrodynamic thrust bearing, particularly forming a part of a hydrodynamic bearing system for a rotary bearing of spindle motors utilized to power hard disk drives.

BACKGROUND OF THE INVENTION

A hydrodynamic bearing system essentially includes a bearing sleeve, a shaft accommodated in an inner cylindrical bore of the bearing sleeve and at least one radial bearing section provided between the bearing sleeve and the shaft with the aid of which the shaft and the bearing sleeve are supported rotatably with respect to each other. A bearing gap is formed between the shaft and the bearing sleeve. The bearing gap is filled with a liquid lubricant, preferably bearing oil.

To take on axial loads, the bearing system is also provided with a hydrodynamic thrust bearing. The thrust bearing is formed by a thrust plate arranged at one end of the shaft and a corresponding cover plate. The cover plate forms a counter bearing to the thrust plate and seals the entire bearing system from below so that no lubricant can escape from the bearing system.

In many cases, the connection between the thrust plate and the shaft is realized by means of a press connection. With motors and hard disk drives becoming ever smaller in size, the overall length available for the bearing system is also being reduced. One method which attempts to overcome this situation involves reducing the thickness of the thrust plate. To achieve an optimal press connection, the so called guiding ratio, the quotient of the compression length t and bore diameter d, should be greater than or equal to 1.

The thinner the thrust plate, the harder it is to achieve the required perpendicularity and the greater the excess size of the shaft in relation to the bore has to be in order to achieve the specified press-out force. This increases the risk that on being mounted onto the shaft, the thrust plate adheres to the shaft resulting in destroying the perpendicularity between the shaft and the thrust plate.

To avoid this problem, when using very thin thrust plates, it is known to connect the thrust plate to the shaft by means of welding. This connecting method is revealed in JP 2000-324753. There is, however, the disadvantage and risk that the bearing system could become contaminated through welding residue which could cause damage to the bearing system. Due to the heat generated in the welding process, there is the added risk that the thrust plate could be deformed and thus rendered unusable.

Another possibility disclosed in U.S. Pat. No. 5,357,163 is to screw the thrust plate to the end face of the shaft. However, on one hand this means that a planar end face has to be provided at a right angle to the shaft end on the other hand this method requires an additional, fault-prone assembly effort.

Another possible solution is to form the thrust plate and the shaft as one piece. Manufacturing such an integral component with the required tolerances, however, involves a very complex and expensive process.

Published patent documents DE 19637014 A1 and DE 19637015 A1 disclose arrangements to mount machine parts on shafts, wherein the shaft formed as a sleeve is provided at one end with a collar set radially outwardly with a flange being force fitted to the collar end facing the shaft. Since the outer diameter of the collar is greater than the inner diameter of the flange bore, the flange has always to be mounted from the longer end of the shaft which is not possible for a hydrodynamic bearing system consisting of a radial and an axial bearing without the risk of damaging the radial bearing surface.

Patent document GB 274 954 relates to an arrangement affixing a machine part to one end of a shaft, wherein the shaft features an axial bore in the area where the machine part is to be positioned and an element to fix the machine part is inserted into this bore. The fixing element takes the form of a ball or a cylindrical plug whose outer diameter is greater than the inner diameter of the bore. Other embodiments of the fixing element are not described.

SUMMARY OF THE INVENTION

The object of the invention is thus to provide a hydrodynamic thrust bearing which allows a stable and high-precision press connection with the shaft even when using very thin thrust plates with a low guiding ratio of t/d<1.

The invention is distinguished by the fact that the thrust plate is arranged on the shaft having an axial bore in the area where the thrust plate is to be positioned. An element fixing the thrust plate is inserted into the axial bore, the fixing element having an outer diameter greater than the inner diameter of the bore.

Pressing the fixing element into the axial bore of the shaft, causes the shaft to expand in the area of the thrust plate, thus creating a radial pressure which fixes the thrust plate to the shaft. The press-out force between the shaft and the thrust plate made possible by the invention is at least as great or greater than the press-out force achieved through a conventional press connection.

In accordance with the present invention, various embodiments of the fixing element are preferred. The fixing element can take an essentially cylindrical form with a rounded peripheral surface. It can also have a truncated conical shape or feature a chamfer on at least one end. Particularly suitable materials include steel, ceramic or brass. The thrust plate as presented in the invention features an annular recess on its inner diameter.

A significant advantage of the invention as compared to the prior art is that even when a very thin thrust plate is used, a high press-out force and good perpendicularity of the thrust plate in relation to the shaft can be achieved.

Commensurate with the specified fit between the thrust plate and the shaft, no force or very little force is required to mount the thrust plate. This means that in attaching the thrust plate, no distortion is caused and the thrust plate does not adhere to the shaft. There is a further benefit in the fact that when the thrust plate is mounted and fixed onto the shaft in accordance with the invention, there is no risk that the contact surfaces of the bearing system will become contaminated by filings or suchlike.

However, mounting the thrust plate onto the shaft requires the use of a high precision mounting device which ensures that the thrust plate is mounted at a right angle to the shaft. It could also be beneficial if the shaft features a shoulder to position the thrust plate at a right angle.

The above aspects, advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF THE DRAWINGS

The invention is illustrated by way of example and not limitation and the figures of the accompanying drawings in which like references denote like or corresponding parts, and in which.

DETAILED DESCRIPTION OF THE PREFERRED EMBODIMENT AND THE DRAWINGS

Figure 1:
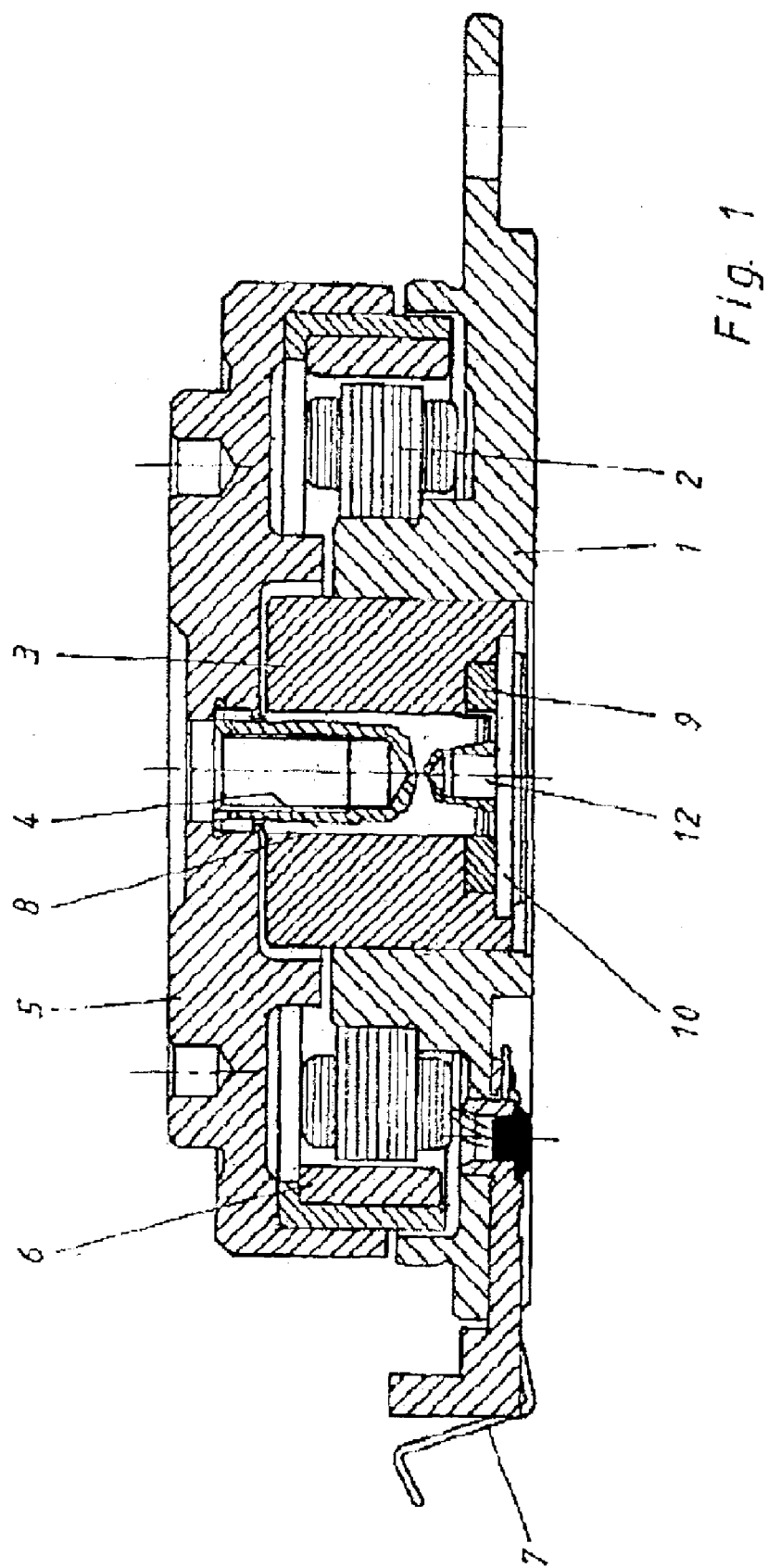
FIG. 1 shows a cross-sectional view of a spindle motor to power a hard disk drive incorporating a first embodiment of the thrust plate according to the invention.

The embodiment shown in FIG. 1 teaches a spindle motor utilized to power a hard disk drive having a hydrodynamic bearing system according to the invention. In the embodiments illustrated, a shaft carrying a rotor is rotatably supported in a stationary bearing sleeve. As would be understood by a person skilled in the art, the invention also includes designs in which a stationary shaft is enclosed by a rotatable bearing sleeve supporting the rotor.

The spindle motor includes stationary baseplate 1 on which stator arrangement 2, consisting of a stator stack and windings, is accommodated. Bearing sleeve 3 is firmly set in a recess in baseplate 1 and features a cylindrical axial bore in which shaft 4 is rotatably accommodated. A free end of shaft 4 supports hub 5 on which one or more storage disks (not illustrated) of the hard disk drive may be arranged and mounted. Located at the inner, lower edge of hub 5 is annular permanent magnet 6 having a plurality of pole pairs which are affected by an alternating electrical field generated by stator arrangement 2 separated from, the poles by an air gap so that rotor-hub 5 is set in rotation together with the shaft 4. Power is supplied to the stator windings by using, for example, electric contacts 7. Bearing gap 8 is formed between the inner diameter of bearing sleeve 3 and the outer diameter of shaft 4. The bearing gap is filled with a lubricant.

The hydrodynamic bearing arrangement is formed by two radial bearing sections, not illustrated here in detail, which are marked by a groove pattern which is provided on the outer surface of shaft 4 and/or on the inner surface of bearing sleeve 3. As soon as the rotor-hub 5 with shaft 4 is set in rotation, hydrodynamic pressure is built up in the lubricant within bearing gap 8 creating the radial load-bearing capacity of the bearing.

A hydrodynamic thrust bearing is formed at the lower end of shaft 4 by thrust plate 9 fixedly mounted onto shaft 4 and cover plate 10. The thrust bearing takes on the axial load of the bearing arrangement. Cover plate 10 forms a counter bearing to thrust plate 9 and seals the entire bearing arrangement from below so that no lubricant can escape from bearing gap 8. Both thrust-plate 9 and cover plate 10 are accommodated in appropriate recesses of bearing sleeve 3.

Figure 2:
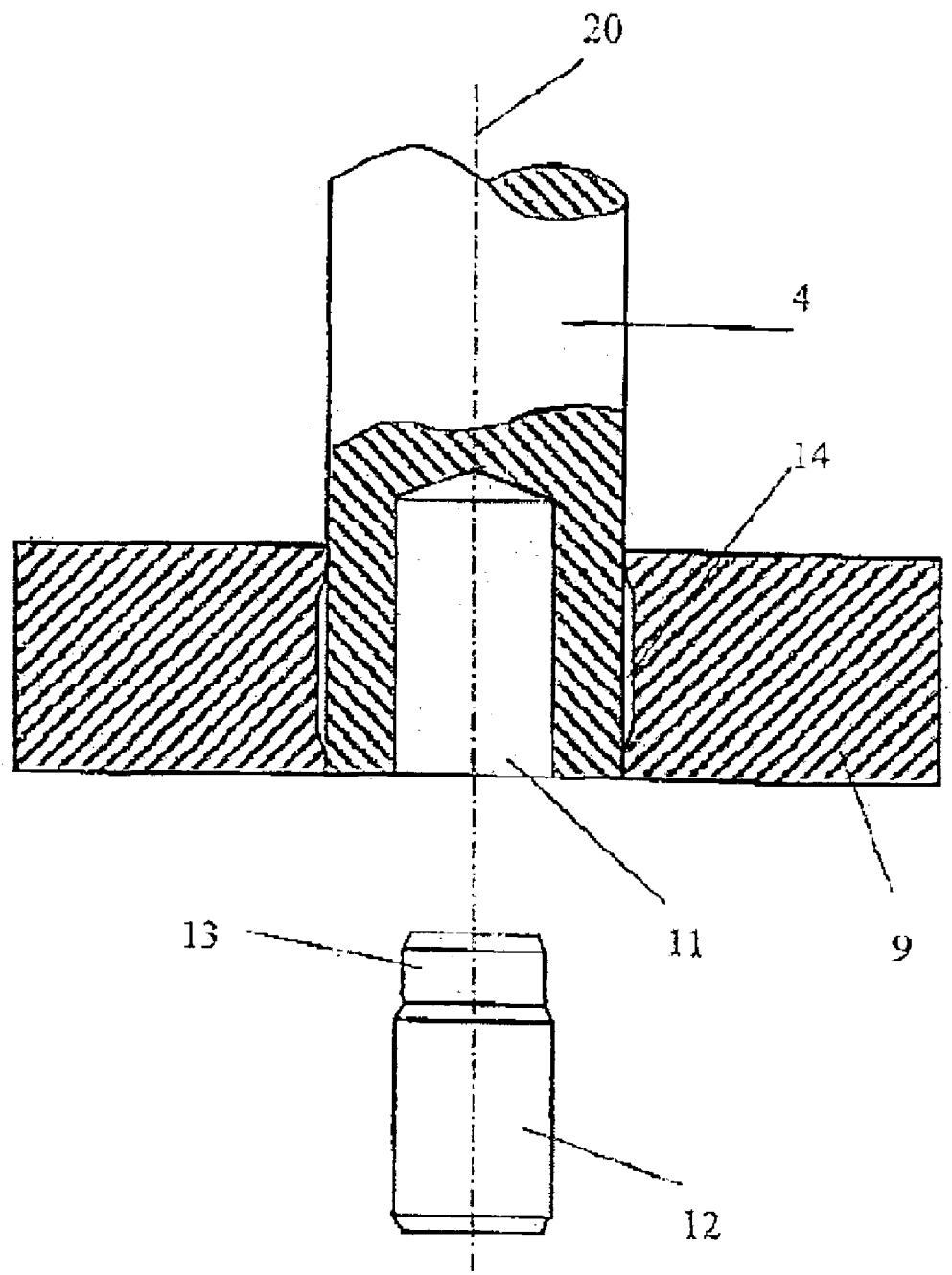
FIG. 2 is an enlarged view of the thrust bearing shown in FIG. 1.

The structure of the thrust bearing and particularly the attachment of the thrust plate to the shaft are explained in more detail in accordance with a first embodiment of the invention with reference to FIGS. 1 and 2.

According to the invention, thrust plate 9 is arranged on the shaft in a sliding fit, a transition fit or by means of a press fit, i.e. the inner diameter of the central bore in the thrust plate 9 is slightly larger, the same size or slightly smaller than the outer diameter of the shaft.

In the area where thrust plate 9 is to be positioned, shaft 4 is provided with axial bore 11. The diameter of the axial bore preferably equals to at least half the thickness of thrust plate 9.

To secure thrust plate 9 to shaft 4, fixing element 12 taking the form of a plug is pressed into axial bore 11 in the shaft. The outer diameter of plug 12 is greater than the inner diameter of the axial bore, so that the shaft expands in this area and creates a radial fit which clamps the thrust plate to the shaft. The larger the axial bore in relation to the diameter of shaft 4 and the greater the excess size of plug 12 compared to the diameter of the axial bore, the greater the expansion in the shaft caused by the insertion of plug 12 and the greater the achievable press-out force.

The plug 12 may feature a diminution 13 or a chamfer at its top end to facilitates its insertion into the bore 11. Before the plug 12 is pressed in, the thrust plate 9 is set at a right angle to the rotational axis 20 of the shaft 4. A high-precision mounting device is used for this purpose.

Annular recess 14 can be provided on the inner diameter of thrust plate 9 that takes up the material expansion of shaft 4 where required and ensures a more even pressing process.

Figure 3:
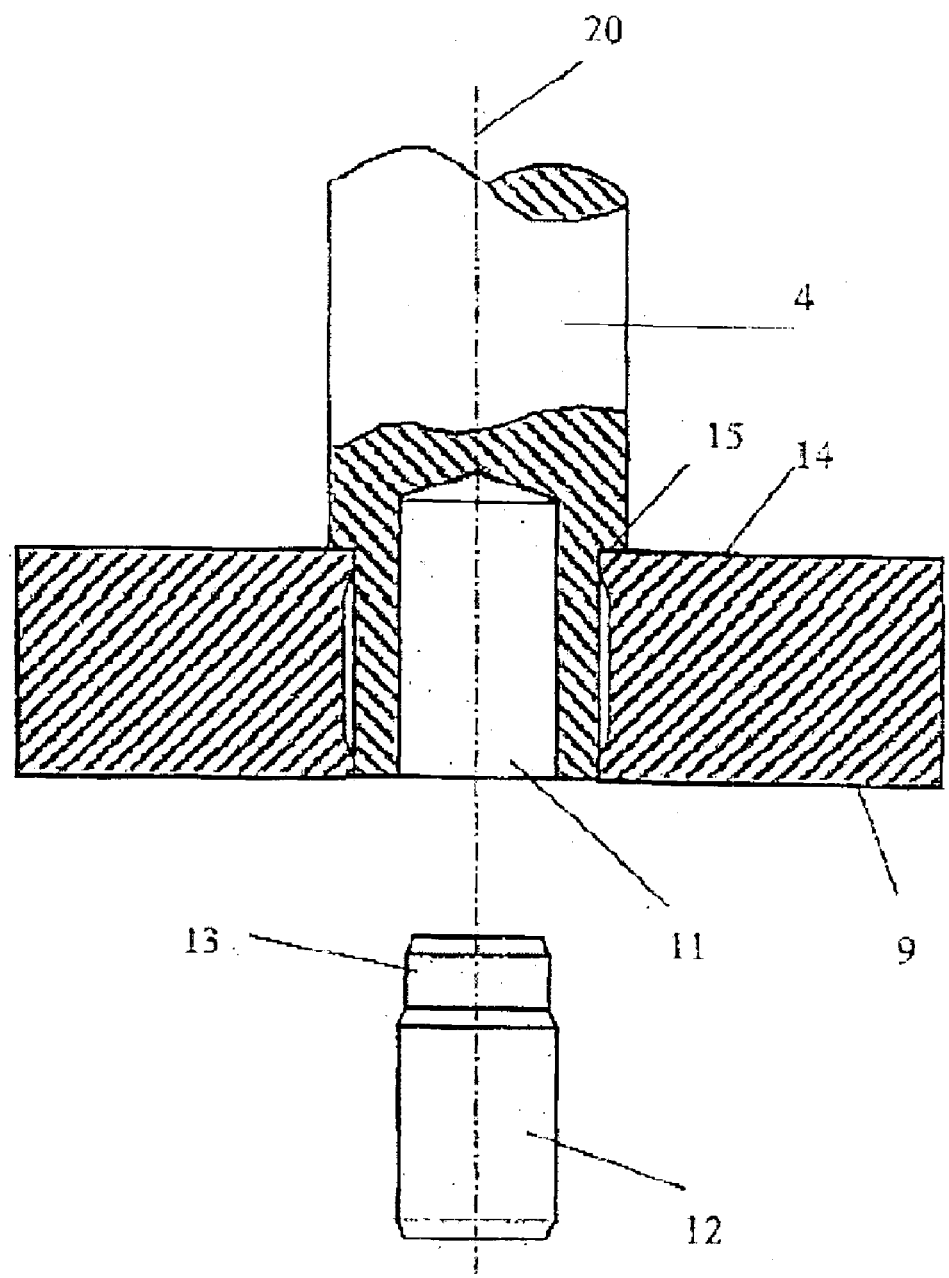
FIG. 3 is an enlarged view of a second embodiment of the thrust bearing.

FIG. 3 shows an embodiment of the invention in which shoulder 15 is provided at the end of the shaft. Thrust plate 9 is arranged in the area where the diameter of shaft 4 is narrower and rests against shoulder 15. High-precision machining of the shoulder can ensure that thrust plate 9 is set at an exact right angle with respect to rotational axis 20 of shaft 4.

Figure 4:
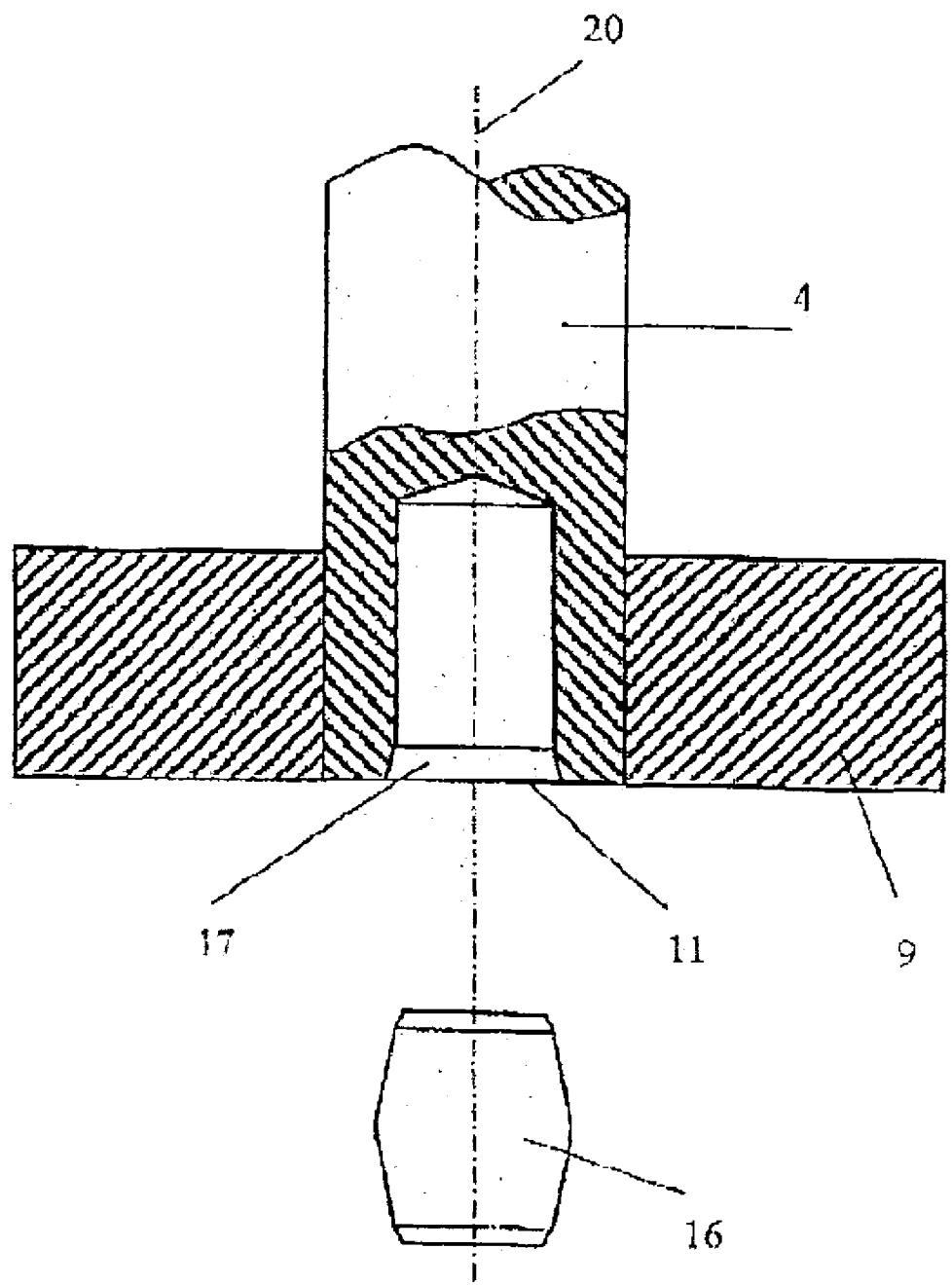
FIG. 4 is an enlarged view of a third embodiment of the thrust bearing.
Figure 5:
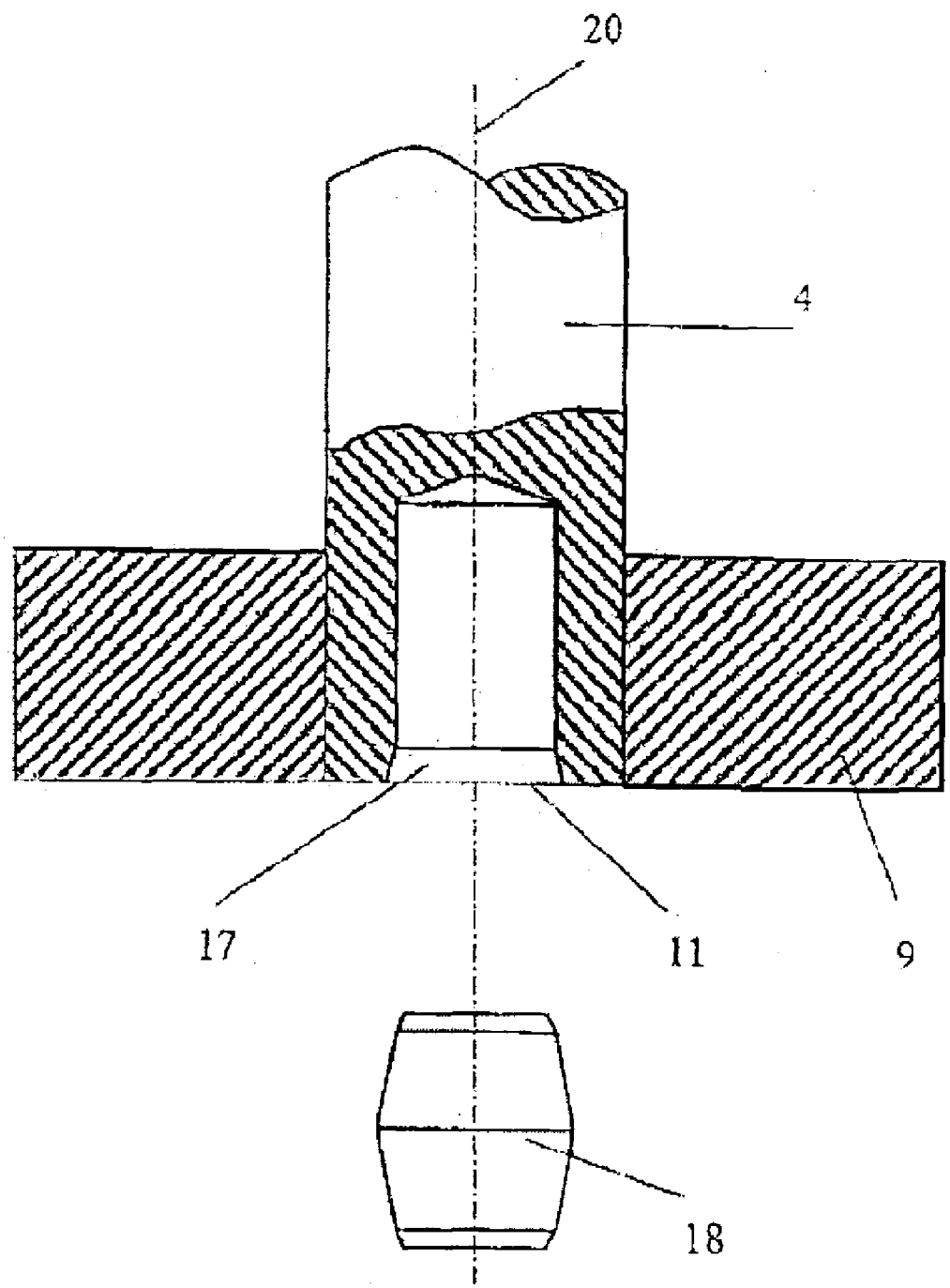
FIG. 5 is an enlarged view of a fourth embodiment of the thrust bearing.

Other possible shapes that the plug can take are illustrated in FIGS. 4 and 5. They also differ from FIGS. 2 and 3 in that thrust plate 9 does not have an inner recess.

Plug 16, in accordance with FIG. 4, is barrel-shaped or rounded. To facilitate the insertion of plug 16, bore 11 in shaft 4 can include counterbore 17.

FIG. 5 shows plug 18 taking the form of two truncated cones, one placed inversely on top of the other, which can be pressed into bore 11 having counterbore 17.

To mount thrust plate 9 to shaft 4, axial bore 11 is first formed in the shaft in the area where thrust plate 9 is to be positioned. Thrust plate 9 is then slid onto or pressed into shaft 4 and set in the desired position at a precise right angle to rotational axis 20 of shaft 4. Finally, fixing element 12 (16; 18) is pressed into axial bore 11 of shaft 4 that causes the diameter of shaft 4 to expand in this area and thus firmly affix thrust plate 9 to the shaft.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

What is claimed is:

1. A hydrodynamic bearing system, comprising:
   a shaft having an axial bore formed therein;
   a radial bearing rotatably supporting said shaft;
   at least one annular thrust plate mounted on said shaft;
   a fixing element affixing said thrust plate to said shaft, said fixing element being inserted into said axial bore of said shaft; and
   a counter bearing corresponding to said thrust plate,
   wherein said axial bore is formed in an area where said thrust plate is to be positioned, wherein an outer diameter of said fixing element is greater than an inner diameter of said axial bore, and wherein said fixing element further comprises a prescribed shape.

2. The hydrodynamic bearing system according to claim 1, wherein said fixing element is a cylindrical plug having a rounded peripheral surface.

3. The hydrodynamic bearing system according to claim 1, wherein said fixing element is a truncated cone.

4. The hydrodynamic bearing system according to claim 1, wherein said shaft further comprises a shoulder which reduces a diameter of said shaft, and wherein said thrust plate is arranged in an area of the reduced diameter of said shaft resting on said shoulder.

5. The hydrodynamic bearing system according to claim 1, wherein said thrust plate is arranged in a sliding fit, a transition fit or a press fit on said shaft.

6. The hydrodynamic bearing system according to claim 1, wherein said thrust plate is set at a right angle to a rotational axis of said shaft.

7. A hydrodynamic bearing system, comprising:
   a shaft having an axial bore formed therein;
   a radial bearing rotatably supporting said shaft;
   at least one annular thrust plate mounted on said shaft;
   a fixing element affixing said thrust plate to said shaft, said fixing element being inserted into said axial bore of said shaft; and
   a counter bearing corresponding to said thrust plate,
   wherein said axial bore is formed in an area where said thrust plate is to be positioned, wherein an outer diameter of said fixing element is greater than an inner diameter of said axial bore, and wherein said fixing element further comprises a chamfer on at least one of its ends.

8. The hydrodynamic bearing system according to claim 7, wherein said shaft further comprises a shoulder which reduces a diameter of said shaft, and wherein said thrust plate is arranged in an area of the reduced diameter of said shaft resting on said shoulder.

9. The hydrodynamic bearing system according to claim 7, wherein said thrust plate is arranged, in a sliding fit, a transition fit or a press fit on said shaft.

10. The hydrodynamic bearing system according to claim 7, wherein said thrust plate is set at a right angle to a rotational axis of said shaft.

11. A hydrodynamic bearing system, comprising:
    a shaft having an axial bore formed therein;
    a radial bearing rotatably supporting said shaft;
    at least one annular thrust plate mounted on said shaft;
    a fixing element affixing said thrust plate to said shaft, said fixing element being inserted into said axial bore of said shaft; and
    a counter bearing corresponding to said thrust plate,
    wherein said axial bore is formed in an area where said thrust plate is to be positioned, wherein an outer diameter of said fixing element is greater than an inner diameter of said axial bore, and wherein said thrust plate further comprises an annular recess on its inner diameter.

12. The hydrodynamic bearing system according to claim 11, wherein said shaft further comprises a shoulder which reduces a diameter of said shaft, and wherein said thrust plate is arranged in an area of the reduced diameter of said shaft resting on said shoulder.

13. The hydrodynamic bearing system according to claim 11, wherein said thrust plate is arranged in a sliding fit, a transition fit or a press fit on said shaft.

14. The hydrodynamic bearing system according to claim 11, wherein said thrust plate is set at a right angle to a rotational axis of said shaft.

* * * * *